Patented Aug. 14, 1945

2,381,882

UNITED STATES PATENT OFFICE 2,381,882

ESTER

Martin E. Cupery, Wilmington, Del., assignor to E. I. du Pont de Nemours & Company, Wilmington, Del., a corporation of Delaware No Drawing. Application December 30, 1940, Serial No. 372,393

20 Claims. (Cl. 106—252)

This invention relates to new synthetic drying oils and to coating compositions containing them.

Of the natural drying oils, China-wood oil, perilla oil, and oiticica oil are outstanding in their ability to form hard, tack-free, water-resistant films when properly formulated into varnish and enamel compositions. Unfortunately, however, these oils are not produced in this country in substantial quantities and have to be imported. This difficulty is increased by the fact that they are subject to wide fluctuations in price, availability, and quality. Also, as is well known, some of these oils have a tendency to form films that "crystallize" or "frost."

Extensive research has therefore been expended in an effort to develop synthetic compositions which possess the drying properties and film-forming characteristics of these natural drying oils, and in a further endeavor to produce synthetic drying compositions which have even better properties and more uniform quality than the natural drying oils. Such prior attempts, however, have in the main been unsuccessful in producing synthetic drying oils which have properties superior to the natural drying oils, or have been uneconomical in that the materials produced have been so expensive they could have no practical commercial use.

This invention has as its general objective the preparation of new esters which can be substituted for the rapidly drying natural fatty oils in coating compositions into which fatty oils are ordinarily formulated.

Another objective is the preparation of new esters having film-forming properties, especially drying rates, hardness, and toughness, of about the same order as, or better than, those of the natural drying oils.

A further objective is the proper combination of polyhydric alcohol and monocarboxylic acids which will give esters having such properties.

A still further objective is the preparation of esters from those monocarboxylic acids which have the particular types of polyunsaturation, and other elements of chemical structure, which will impart rapid drying film properties to said esters.

Another general objective is the preparation of esters, suitable for use in coating compositions, from acids which are available economically or may be made so readily.

An additional objective is the provision of methods of making these new esters.

The above and other objects appearing hereinafter are accomplished by preparing, for example, by one of the methods subsequently described in detail, a polyhydric alcohol mixed ester, the acidic radicals of which comprise the radical of a certain type of polyunsaturated cyano monocarboxylic acid, as defined below, and the radical of at least one monofunctional monocarboxylic acid of different structure.

The term "monofunctional" means that the monocarboxylic acid contains no group capable of undergoing reaction with the carboxyl group under normal esterification conditions; i. e., acids having an OH, $NH_2$, or NHR group would not be suitable. These different monofunctional monocarboxylic acids are preferably unsaturated, the acids of natural drying or semi-drying oils being most useful.

The polyunsaturated cyano monocarboxylic acids suited for use in this invention are aliphatic monocarboxylic acids having ethylenic double bonds, either actually or potentially, in the 2 and 4 positions (i. e., having, or capable of having under the conditions of use, the partial structure —C=C—C=C—COOH), the cyano group being attached to the alpha carbon atom, or to a carbon atom further removed from the carboxyl group.

In one of the preferred methods of carrying out the invention, a polyunsaturated cyano monocarboxylic acid is reacted with a polyhydric alcohol which has been partially esterified with the different acid or acids. When these polyhydric alcohol partial esters are glycerol partial esters of a long chain fatty acid, they are most suitably obtained by heating fatty oils in the usual way with glycerol and, preferably, an ester-interchange catalyst. In carrying out this alcoholysis step, the oil and free polyhydric alcohol, in proportions calculated to give the degree of alcoholysis desired, are placed along with a small amount of an alcoholysis catalyst (e. g., 0.001–0.01% sodium hydroxide based on the oil) in a reactor fitted with an agitator, a device to measure the temperature, and a gas inlet. The mixture is then heated with stirring for 1–2 hours at about 200–225° C., an oxygen-free inert gas such as carbon dioxide or nitrogen being passed into and over the mixture. In order to esterify this polyhydric alcohol partial ester with the cyano unsaturated acid, the partial ester is cooled to about 140–160° C., and the cyano unsaturated acid introduced in approximately the amount sufficient to esterify the free hydroxyl groups calculated to be present from the initial proportions of the oil and polyhydric alcohol. A hydrocarbon solvent such as toluene is next added in amount sufficient to produce boiling at esterification temperatures, which are in the approximate range of 130–220° C. The distilling vapors of solvent and water of esterification are passed through a downward condenser, the water separated mechanically from the condensed liquids, and the solvent returned to the reaction vessel, the whole cycle of distillation, separation of water, and return of solvent being conducted in a continuous manner. Depending on the temperature of reaction, which in turn is governed by the nature and amount of solvent employed, the reaction can be completed in a period of time ranging from 1 to 24 hours; thus, when the temperature is around 150° C., the process is usually complete within 8 hours. There is obtained a solution of the new drying oil, from which the solvent can be removed by distillation if desired. The resulting oil, or its solution as obtained in the process, can be formulated, by conventional methods used with natural drying oils, into valuable coating compositions. For such purposes, it can be used alone, or in blends with resins and/or natural drying or semi-drying oils.

Another good way to carry out the process is to heat together the cyano unsaturated acid, polyhydric alcohol, and other acid, e. g., the fatty oil acid, until the desired degree of esterification is obtained.

In preparing the esters of the present invention, certain precautions are often necessary in order to obtain satisfactory results from a number of standpoints. These precautions are necessary since certain of these acids (particularly α-cyano acids) tend to be unstable on heating at elevated temperatures. In order to avoid this decomposition, the esterification reaction in these instances is preferably carried out at as low a temperature as possible without obtaining unduly slow reaction. As will be seen from the examples, another desirable precaution is the maintenance of an inert atmosphere by the use of an oxygen-free inert gas. By complete or essentially complete exclusion of oxygen, superior color is obtained, while, if the reaction is carried out at high temperature in the presence of oxygen, poorer color, combined with decomposition and sometimes inferior drying, is encountered. To obtain light-colored products, it is also necessary to avoid use of materials which liberate oxygen under reaction conditions. Thus, solvents employed should not be those which contain or give off free oxygen or similar active products during the reaction. For example, aged turpentine or old samples of petroleum naphtha should not be used since the peroxides usually present in these materials produce deleterious effects. Other oxygen-yielding compounds, for example, oxidized drying oils, should be excluded in order to insure good color, and to avoid degradation and gelation of the resulting compositions.

The more detailed practice of the invention is illustrated in the following examples wherein the amounts of the ingredients are by weight, such examples being given by way of illustration and not as a limitation. In these examples, viscosities and colors are given on the Gardner-Holdt scale, and the hydroxyl numbers are all corrected for acidity. Where the use of cobalt drier is mentioned, sufficient of a 2% cobalt naphthenate solution has been used to give the indicated content of cobalt metal, this proportion being based on oil.

The ester compositions in the titles of each example are an index to the proportion of cyano unsaturated acid radicals in the product; i. e., they do not mean the product actually contains the stated percentages of, for example, the compounds linseed acids glyceride and cyano unsaturated acid glyceride. To illustrate, a product referred to as having 20.4% cyano unsaturated acid glyceride and 79.6% linseed acids glyceride is a product prepared from proportions of reactants so chosen as to yield a mixture of the two mentioned glycerides in the stated proportions by weight, theoretically, i. e., if it be assumed no mixed ester is formed. Actually, such a product is considered to be composed principally of mixed glycerides, probably mixtures of mixed glycerides, though small amounts of simple glycerides, partial glycerides (i. e., glycerol incompletely esterified), free glycerol, and free acids are undoubtedly present. The significance of the cyano unsaturated acid ester content is discussed following the examples.

EXAMPLE 1

Glycerol mixed ester of linseed oil acids and 2-cyanohexadien-2,4-oic acid

| | Percent |
|---|---|
| 2-cyanohexadien-2,4-oic acid glyceride | 20.4 |
| Linseed acids glyceride | 79.6 |

Alkali-refined linseed oil, 1300 parts, is agitated for 1.5 hours at 250° C. in an atmosphere of nitrogen with 69.4 parts of refined glycerol. The partial glyceride thus prepared, 80 parts, is heated with 17.8 parts of 2-cyanohexadien-2,4-oic acid

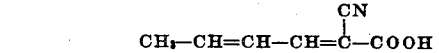

(see U. S. Patent No. 2,093,519) and 28 parts of toluene under an atmosphere of deoxidized nitrogen at a temperature of 150° C. for 5 hours. After cooling, filtering, and removing the volatile solvent, there is obtained a fluent oil, chemical composition as above, having the following physical and analytical values: $N_D^{25}$, 1.4890; $d_4^{25}$, 0.9628; hydroxyl No. 24.2; saponification No. 219.4; acid No. 10.5; viscosity I; nitrogen 1.78%. This oil is of relatively low viscosity; therefore, it is possible to prepare coating compositions of high solids content at working viscosities.

Films from this oil, containing 0.03% cobalt drier, dry tack-free at room temperature overnight, whereas linseed oil under the same conditions retains a residual tack and gives soft films. The dry films are clear, smooth, hard, and tough, and in many respects are similar to, or even superior (particularly in outdoor durability on 8 months' exposure in Delaware) to, films obtained from limed rosin/China-wood oil varnishes of about 45-gallon oil length. Films which are baked at 100° C. for 30 minutes are very hard and tack-free.

The above product can be made into a varnish as follows: The oil is first bodied to a viscosity greater than Z–6 by heating under nitrogen at 300° C. for 2 hours. To 7.8 parts of this heat-bodied oil are added 3.5 parts of a 64% solution of limed rosin in mineral spirits and sufficient soluble lead and manganese naphthenates to give a solution containing 4.0% and 0.04% of lead and manganese, respectively. This mixture is diluted to a viscosity of E with 6 parts of mineral spirits. Films flowed from this varnish composition are dry and hard after overnight drying and are comparable to analogous vehicles prepared from 45-gallon China-wood oil/limed, leaded rosin or 45-gallon perilla oil/"Amberol" varnishes.

The product of this example can be made into an enamel as follows: 40 parts of the oil, 20 parts of titanium dioxide, 20 parts of antimony oxide, and 40 parts of aromatic hydrocarbon solvent are ground in a pebble mill for 5 days. Sufficient cobalt naphthenate solution is then added to the enamel to give a resulting product containing 0.03% cobalt, based on the oil. This enamel dries in about 18 hours at 25° C.; the films are clear, tack-free, and hard.

Instead of linseed oil, mixtures of linseed oil and soya bean oil can be used in preparing mixed esters according to the procedure outlined above.

EXAMPLE 2

*Glycerol mixed ester of linseed oil acids and 2-cyanohexadien-2,4-oic acid—Preparation from cyanoacid chloride*

| | Per cent |
|---|---|
| 2-cyanohexadien-2,4-oic acid glyceride | 20.4 |
| Linseed acids glyceride | 79.6 |

A mixture of 100 parts of linseed oil diglyceride, prepared as in Example 1, 27.2 parts of 2-cyanohexadien-2,4-oic acid chloride, and 22.2 parts of pyridine is maintained at 30–35° C. for a period of 30 minutes and then allowed to stand at room temperature for several hours. (The acid chloride of 2-cyanohexadien-2,4-oic acid may be prepared by reacting 2-cyanohexadien-2,4-oic acid with phosphorus pentachloride; B. P. 121-2° C./14 mm., % chlorine calculated 22.9, found 23.2.) About 300 parts of water is added to the reaction mixture, the mixture vigorously shaken, and the layers separated. The product is then washed with aqueous sodium bicarbonate solution, dissolved in benzene, dried over sodium sulfate, and the benzene removed by vacuum distillation. The resulting oily product has an $N_D^{25}$ 1.4489 and a viscosity E.

This mixed glyceride possesses the same film-forming characteristics as those described in Example 1.

EXAMPLE 3

*Mixed glyceride of soya bean oil acids and 2-cyanohexadien-2,4-oic acid*

| | Per cent |
|---|---|
| 2-cyanohexadien-2,4-oic acid glyceride | 52.0 |
| Soya bean acids glyceride | 48.0 |

The monoglyceride of soya bean acids is prepared by heating 66 parts of refined soya bean oil, 13.8 parts of glycerol, and 0.08 part of litharge in an atmosphere of pure nitrogen at 180° C. for 1 hour. 2-cyanohexadien-2,4-oic acid, 61.5 parts, and 20 parts of toluene are added to the monoglyceride at about 100° C., and the heating is continued at 140–150° C. for 6 hours. The product thus obtained, chemical composition as above, has the following physical and analytical values: hydroxyl No. 33; iodine No. 121; saponification No. 183; acid No. 10.5.

A black enamel is prepared by grinding 8 parts of carbon black pigment with 50 parts of this oil and 50 parts of heat-bodied, alkali-refined linseed oil. This enamel, with 0.1% cobalt, air dries or bakes (i. e., at 100–115° C.) to glossy, tough films, which are much superior to films from a corresponding linseed oil paint, or a paint prepared from a mixture of linseed and soya oils.

It will be noted that the examples given have as a part of their caption the amounts of polyhydric alcohol simple esters of each acid that are present in the products, theoretically, i. e., if it be assumed that no mixed esters are formed. The meaning of these figures is discussed hereinbefore.

It has been found that, for each particular combination of polyhydric alcohol, cyano unsaturated acid, and other monocarboxylic acid, there is a range of cyano unsaturated acid-polyhydric alcohol simple ester content, within which the products dry fastest, have best film properties generally, and can be made most easily.

In regard to the glycerol mixed esters of cyano unsaturated acids generally, and more particularly in regard to glycerol mixed esters of cyano unsaturated acids and drying or semi-drying oil acids (especially linseed oil acids), it will usually be found that the most valuable products are those having on the order of 5–60% cyano unsaturated acid glyceride. The proportions for best results will, however, vary somewhat with the particular ingredients. Thus, with glycerol, 2-cyanohexadien-2,4-oic acid, and linseed oil acids, the optimum range is from about 10% to about 45% of the 2-cyanohexadien-2,4-oic acid glyceride. As the amount is lowered to 0%, the drying time increases, approaching and reaching that of linseed oil. As the amount is increased from about 45%, the products are increasingly difficult to prepare, at least in part because of the increasing tendency to gelation, and the films tend to become more brittle.

After the film-forming properties of esters obtained from different proportions of a particular polyhydric alcohol, cyano unsaturated acid, and other monocarboxylic acid have been established by simple testing, it is possible to prepare, by appropriate selection of proportions, a polyhydric alcohol mixed ester having any desired degree of improvement in film-forming properties (up to the maximum possible for the ingredients involved) as compared to the polyhydric alcohol simple ester of the acid other than the cyano unsaturated acid. More specifically, where the polyhydric alcohol is glycerol and the other acid is drying or semi-drying oil acids, it is possible, by appropriate selection of proportions, to prepare a mixed glyceride having any desired degree of improvement (up to the maximum possible for the ingredients involved) as compared to the drying or semi-drying oil whose acids are being used.

Thus, from soya bean oil, glycerol, and 2-cyanohexadien-2,4-oic acid, it is possible to make oils that in drying ability and film properties are at least equal (5–10% 2-cyanohexadien-2,4-oic acid glyceride) or definitely superior (above 10% 2-cyanohexadien-2,4-oic acid glyceride) to linseed oil.

Similarly, it is possible to make, from linseed oil, glycerol, and a cyano unsaturated acid, oils which are equal to or better than oils which are superior to linseed oil. For example, a glycerol mixed ester having only 5% 2-cyanohexadien-2,4-oic acid glyceride becomes the equal of dehydrated castor oil; one having about 15% of the 2-cyanohexadien-2,4-oic acid glyceride is like China wood oil; and those having more than 15% of the 2-cyanohexadien-2,4-oic acid glyceride are superior to China wood oil.

In the case of perilla and oiticica oils, which are intermediate in drying properties between linseed and China wood oils, an introduction of about 5% 2-cyanohexadien-2,4-oic acid glyceride makes them the equal of, and more than 5% makes them superior to, China wood oil.

A remarkable characteristic of those of the new oils which are in the China wood oil range is that they dry to clear, smooth films and do not frost or wrinkle as does China wood oil.

The desired proportion of cyano unsaturated acid glyceride is normally obtained by using the calculated amount of the selected cyano unsaturated acid or esterifiable derivative. However, an effect which approaches or equals the behavior of the mixed ester so made can be obtained by preparing a mixed ester of a cyano unsaturated acid glyceride content higher than that desired, and blending it, preferably at elevated temperature, with the drying oil whose acids are being used (or a different oil if desired) in an amount which is calculated to give a mixed ester of the desired cyano unsaturated acid glyceride content. Suitable conditions are, for example, the heating of the two oils, with stirring and in an inert gas atmosphere, for about 0.5 hour at about 200° C., under which conditions it is probable that some interchange occurs, since the film-forming properties are somewhat better than for simple cold blends of the two oils.

The mixed esters of the present invention can be made by reacting the polyhydric alcohol with the cyano unsaturated acid (or an esterifiable derivative) and with the other monocarboxylic acid or acids (or their esterifiable derivatives) simultaneously or successively in any order. Or a polyhydric alcohol simple ester of either the cyano unsaturated acid or the other acid or acids can be reacted successively with additional polyhydric alcohol and the remaining acid or acids. In the first, i. e., alcoholysis, step of this latter process, an ester interchange catalyst such as litharge, sodium hydroxide, sodium glycerolate, etc., is preferably included in small amount, suitably from 0.001% to 1.0%.

Suitable types of esterifiable derivatives of both the cyano unsaturated acids and the different acids are the anhydride, an acid halide, or an ester with an alcohol more volatile than the polyhydric alcohol whose ester is to be prepared.

Solvents and other preparative details should be adjusted to the method chosen, the method of so doing being apparent to one skilled in the art. When the solution method heretofore discussed is to be used, any inert water-immiscible liquid which dissolves the product is suitable, hydrocarbons being preferable, and the amount can be varied as desired. Suitable specific solvents include toluene, xylene, cymene, amyl benzene, tetrachloroethane, anisol, and cyclohexanone. Aromatic hydrocarbons, chlorinated solvents, ethers, and ketones are suitable in general. A boiling point in the range 100–200° C. is desirable. The process of the invention can also be carried out in the absence of a solvent.

In addition to glycerol, other polyhydric alcohols can be used in the present invention, such as hexamethylene glycol, pentaerythritol, methyltrimetholmethane, erythritol, p,p'-di(2-hydroxyethyl)benzene, decamethylene glycol, diethylene glycol, sorbitol, and cyclohexyl-1,2-dicarbinol.

The monofunctional monocarboxylic acid or acids of different structure than the cyano unsaturated acid can be any monofunctional monocarboxylic acid of different structure, or any mixture of such acids, such as mixtures of linseed and China wood oil acids. Other specific acids that are suitable include perilla oil acids, oiticica oil acids, lauric acid, p-toluic acid, crotonic acid, cinnamic acid, corn oil acids, cottonseed oil acids, coconut oil acids, furoic acid, sorbic acid, quinolinic acid, alpha-naphthionic acid, oleic acid, stearic acid, phenoxyacetic acid, and the like. These acids can be aromatic or aliphatic; open or closed chain and, if the latter, monocyclic, polycyclic, homocyclic, or heterocyclic; saturated or unsaturated; straight or branched chain; and substituted or not by other groups or atoms, such as ether, ketone, halogen, etc., which do not interfere with the desired esterification reaction.

Any cyano unsaturated acid, as the term is hereinbefore explained, can be employed. The table below gives other specific suitable acids by name, formula and source.

ALTERNATIVE UNSATURATED CYANO ACIDS

| Name of acid | Structure | Preparation |
|---|---|---|
| 2-cyano-5,9-dimethyl-decatriene-2,4,8-oic. | $(CH_3)_2C=CHCH_2CH_2C(CH_3)=CHCH=C(CN)COOH$ | Citral + $CH_2\begin{smallmatrix}CN\\COOH\end{smallmatrix}$ |
| 2-cyano-3,5-dimethyl-hexadiene-2,4-oic. | $(CH_3)_2C=CHC(CH_3)=C(CN)COOH$ | Mesityl oxide + $CH_2\begin{smallmatrix}CN\\COOH\end{smallmatrix}$ |
| 2,4-dicyano-hexadiene-2,4-oic. | $CH_3CH=\underset{CN}{C}CH=\underset{CN}{C}-COOH$ | $CH_3CH=\underset{Cl}{C}-CH=\underset{CN}{C}-COOH$ + NaCN |
| 2-methyl-4-cyano-hexadiene-2,4-oic. | $CH_3CH=\underset{CN}{C}-CH=\underset{CH_3}{C}-COOH$ | $CH_3CH=\underset{Cl}{C}-CH=\underset{CH_3}{C}COOH$ + NaCN |
| 2-cyano-4-methyl-5-phenylpentadien-2,4-oic. | $C_6H_5CH=C(CH_3)CH=C(CN)COOH$ | $C_6H_5CH=\underset{CH_3}{C}-CHO$ + $CH_2\begin{smallmatrix}CN\\COOH\end{smallmatrix}$ |
| 2-cyano-octadien-2,4-oic. | $C_3H_7CH=CHCH=C(CN)COOH$ | $C_3H_7CH=CHCHO$ + $CH_2\begin{smallmatrix}CN\\COOH\end{smallmatrix}$ |
| 2-cyano-4-methyl-7-phenyl-heptatriene-2,4,6-oic. | $C_6H_5CH=CHCH=C(CH_3)CH=C(CN)COOH$ | $\phi CH=CHCH=\underset{CH_3}{C}-CHO$ + $CH_2\begin{smallmatrix}CN\\COOH\end{smallmatrix}$ |

| Name of acid | Structure | Preparation |
| --- | --- | --- |
| 4-cyano-hexadien-2,4-oic | CH₃CH=C(CN)CH=CHCOOH | CH₃CH=C—CHO + CH₂(COOH)₂<br>        │<br>        CN<br>or<br>CH₃CH=C—CH=CHCOOH + NaCN<br>        │<br>        Cl |
| 2-cyano-5-cyclohexyl-pentadien-2,4-oic | C₆H₁₁CH=CHCH=C(CN)COOH | C₆H₁₁CH=CHCHO + CH₃—CH(CN)—COOH |
| α-cyano-α-(β-ionylidene) acetic | (structure of β-ionylidene cyanoacetic acid) | δ-ionone + CNCH₂COOC₂H₅ |

The examples and general description indicate that the new oils of the present invention are generally useful for formulation into coating compositions, which latter can also contain (as needed and desired for the particular purpose to which they are to be put) natural resins; synthetic resins; cellulose derivatives such as nitrocellulose and cellulose acetate; waxes; natural drying oils; other oils; pigments; fillers; cork; bitumens; solvents; etc. The new oils can be blown or heat-bodied in a manner quite similar to the natural drying oils, and they react toward driers in a manner generally similar to linseed oil. Driers and solvents which are effective with natural drying oils work well with the new oils, although, if very light-colored products are to be made, lead driers are undesirable.

These compositions can be applied to many kinds of surfaces and materials, e. g., metal, wood, paper, linen, silk, cotton textiles, regenerated cellulose wrapping foil, etc. Specific manufactures that can be so produced are linoleum, patent leather, linoxyn-type materials, coated copper wire, oiled cloth, oiled silk, and sandpaper. The products of the invention can also be made up into molding compositions, putties, and the like. In addition, they can be employed as modifying agents for urea-formaldehyde and phenol-formaldehyde resins.

It will be apparent from the foregoing description that new mixed esters having remarkable properties and a wide utility have been obtained. In particular, these esters are valuable substitutes for the natural drying oils in coating compositions, thereby reducing materially the dependence upon these natural products. The new esters have also many advantageous properties not shared by the natural oils, as for example, the ability to form films which do not crystallize, wrinkle, or frost, as do films from the more rapidly drying natural oils. Furthermore, it is possible to take any fatty oil, including one that has a low order of drying, and, by substituting a part of the fatty acid making up that oil by a cyano unsaturated acid, to improve the drying and film properties greatly. The compositions of the present invention are particularly outstanding in that they combine the high film build of the natural drying oils (resulting from the much higher solids content at working viscosities) with the ability of resin-oil varnishes to dry rapidly to hard, tough films.

It is apparent that many widely different embodiments of this invention may be made without departing from the spirit and scope thereof; and, therefore, it is not intended to be limited except as indicated in the appended claims.

I claim:

1. A polyhydric alcohol mixed ester of a cyano unsaturated monocarboxylic acid having ethylenic double bonds in the 2 and 4 positions in which the ethylenic carbon atoms that are in direct conjugation with the carboxyl group are each attached to no more than one hydrogen atom, and a monofunctional monocarboxylic acid of different structure.

2. A polyhydric alcohol mixed ester of a cyano unsaturated monocarboxylic acid having ethylenic double bonds in the 2 and 4 positions in which the ethylenic carbon atoms that are in direct conjugation with the carboxyl group are each attached to no more than one hydrogen atom, and a natural fatty oil acid.

3. A polyhydric alcohol mixed ester of a cyano unsaturated monocarboxylic acid having ethylenic double bonds in the 2 and 4 positions in which the ethylenic carbon atoms that are in direct conjugation with the carboxyl group are each attached to no more than one hydrogen atom, and a natural drying oil acid.

4. A glycerol mixed ester of a cyano unsaturated monocarboxylic acid having ethylenic double bonds in the 2 and 4 positions in which the ethylenic carbon atoms that are in direct conjugation with the carboxyl group are each attached to no more than one hydrogen atom, and a natural drying oil acid.

5. A glycerol mixed ester of 2-cyanohexadien-2,4-oic acid.

6. The ester of claim 4 containing that proportion of radicals of the cyano unsaturated acid which theoretically gives a content of glycerol simple ester of that acid in the range of about 5–60% by weight.

7. The ester of claim 4 containing that proportion of radicals of the cyano unsaturated acid which theoretically gives a content of glycerol simple ester of that acid in the range of about 5–60% by weight, and said second-mentioned acid being linseed oil acid.

8. The ester of claim 5 containing that proportion of radicals of 2-cyanohexadien-2,4-oic acid which theoretically gives a content of 2-cyanohexadien-2,4-oic acid glyceride in the range of about 10–45% by weight, and said other acid being linseed oil acid.

9. A composition consisting essentially of a mixed ester of a polyhydric alcohol and a plurality of monocarboxylic acids, one of said acids being a cyano unsaturated monocarboxylic acid in which ethylenic double bonds are in the 2 and 4 positions and in which the ethylenic carbon atoms that are in direct conjugation with the carboxyl group are each attached to no more than one hydrogen atom, the remaining acid or acids being monofunctional, monocarboxylic, unsaturated, and of a different structure.

10. A coating composition containing the product of claim 1.

11. A coating composition containing the product of claim 5.

12. A varnish containing the product of claim 1, a drier, and a varnish solvent.

13. A varnish containing the product of claim 5, a drier, and a varnish solvent.

14. An enamel containing the product of claim 1, a pigment, a drier, and a volatile solvent.

15. An enamel containing the product of claim 5, a pigment, a drier, and a volatile solvent.

16. The method which comprises reacting an acid of the group which consists of cyano unsaturated monocarboxylic acids having ethylenic double bonds in the 2 and 4 positions in which the ethylenic carbon atoms that are in direct conjugation with the carboxyl group are each attached to no more than one hydrogen atom and monofunctional monocarboxylic acids of different structure, with a polyhydric alcohol partially esterified with the other type of acid.

17. The method of improving the drying of natural fatty oils which comprises reacting these oils successively with a polyhydric alcohol and a cyano unsaturated monocarboxylic acid having ethylenic double bonds in the 2 and 4 positions in which the ethylenic carbon atoms that are in direct conjugation with the carboxyl group are each attached to no more than one hydrogen atom.

18. The method which comprises reacting a polyhydric alcohol partial ester of a natural fatty oil acid with a cyano unsaturated monocarboxylic acid having ethylenic double bonds in the 2 and 4 positions in which the ethylenic carbon atoms that are in direct conjugation with the carboxyl group are each attached to no more than one hydrogen atom.

19. The method of improving the drying of natural fatty oils which comprises reacting the acids of these oils with a polyhydric alcohol and a cyano unsaturated monocarboxylic acid having ethylenic double bonds in the 2 and 4 positions in which the ethylenic carbon atoms that are in direct conjugation with the carboxyl group are each attached to no more than one hydrogen atom.

20. The method of improving the drying of natural fatty oils which comprises reacting the acids of these oils with a polyhydric alcohol and 2-cyanohexadien-2,4-oic acid.

MARTIN E. CUPERY.